United States Patent [19]
Behnk et al.

[11] Patent Number: 5,106,335
[45] Date of Patent: Apr. 21, 1992

[54] METHOD OF DEBONING FISH AND APPARATUS FOR CARRYING OUT THIS METHOD

[75] Inventors: Günther Behnk, Reinfeld; Günther Pinkerneil, Lübeck, both of Fed. Rep. of Germany

[73] Assignee: Nordischer Maschinenbau Rud.Baader GmbH+CO KG, Lubeck, Fed. Rep. of Germany

[21] Appl. No.: 606,727

[22] Filed: Oct. 31, 1990

[30] Foreign Application Priority Data

Nov. 15, 1989 [DE] Fed. Rep. of Germany ....... 3937972

[51] Int. Cl.⁵ .................................... A22C 25/16
[52] U.S. Cl. .................................... 452/162; 452/151
[58] Field of Search ................ 452/162, 161, 151, 135

[56] References Cited
U.S. PATENT DOCUMENTS

| | | | |
|---|---|---|---|
| 3,955,242 | 5/1976 | Hartmann | 452/162 |
| 4,056,866 | 11/1977 | Wenzel | 452/162 |
| 4,084,294 | 4/1978 | Dohrendorf | 452/162 |

*Primary Examiner*—Willis Little
*Attorney, Agent, or Firm*—Fay, Sharpe, Beall, Fagan, Minnich & McKee

[57] ABSTRACT

A method for deboning fish is performed by means of an apparatus in which the fish rumps, with their head end leading, pass tools which initially cut free the belly spokes and ribs, the cutting free of the latter occurring up to the back spokes. These back spokes are then extracted from the back portion of the fish rump by downwardly displacing the vertebral column from the fish path, guide faces having scraping edges being guided in the rib cuts and extending up to the flanks of the back spokes, so that the extracting of the same is supported by scraping-off the meat from the back spokes. A splitting of the fish rump in the plane of the removed back spokes produces a double fillet when the cutting depth of the corresponding severing knife is limited up to the region of the tips of the belly spokes, whereas the gaining of individual fillets of maximum yield is possible by removal of the back fin strip together with the fin holders.

10 Claims, 2 Drawing Sheets

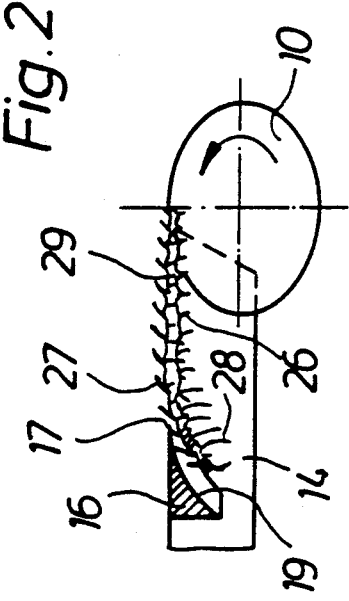
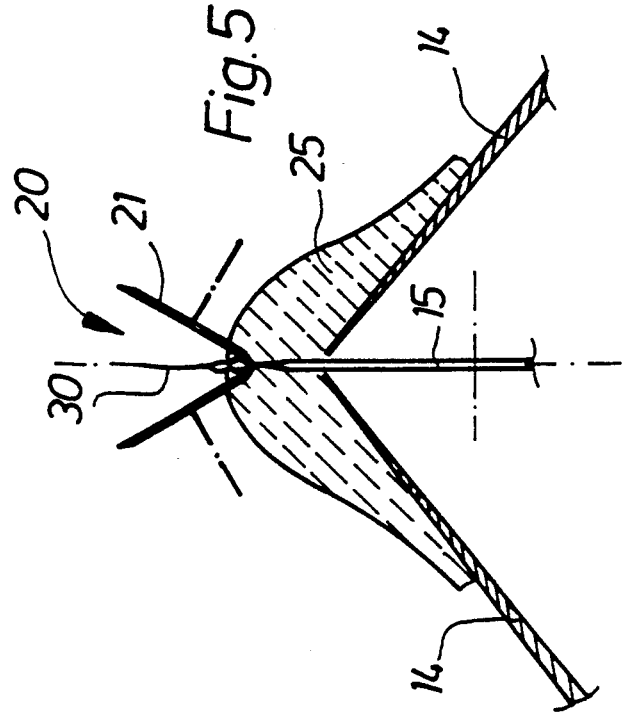
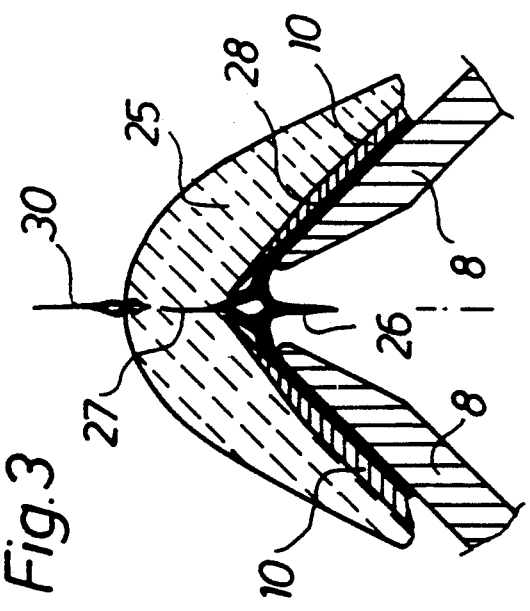
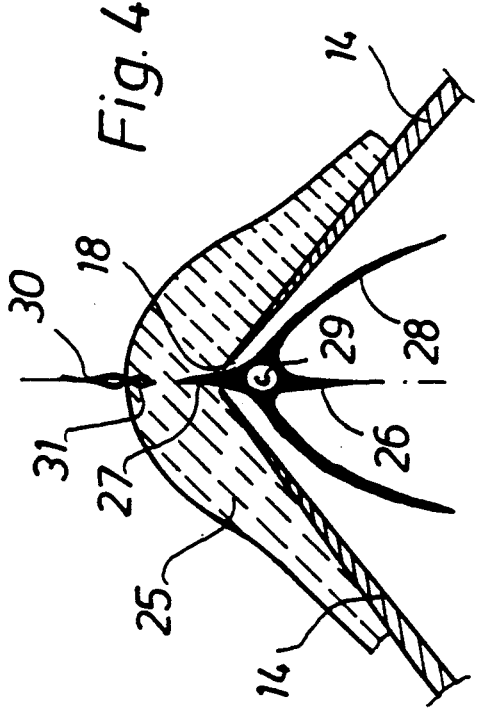

METHOD OF DEBONING FISH AND APPARATUS FOR CARRYING OUT THIS METHOD

BACKGROUND OF THE INVENTION

1. Field of the Invention

The invention relates to a method for processing fish by deboning, which fish are conveyed with their head leading and from which meat is obtained by detaching and removing the belly and back spokes of the fish as well as the ribs and the vertebral column. The invention also relates to an apparatus for performing such method, the apparatus comprising a conveyor for advancing the fish with their head end leading as well as tools for cutting free the belly spokes and the ribs up to the back spokes.

2. Prior Art

Due to the progressing shortage and rise in price of fish as well as due to the simultaneously increasing demand for fish, it is of increasing importance in the processing of fish that fish to be processed are treated in a manner that the loss in fish meat appropriate for human nutrition is kept at a minimum. In the past, several concepts have been followed which were additionally based on this aspect.

For example, from German Patent 503 060 and the corresponding German Patent of Addition 509 733, there is known an apparatus for cutting open, cleaning and deboning fish. In this apparatus, a supporting disc driven to rotate is used as conveying means, which disc seizes the fish to pull them by their tail and support them by their backs. The deboning is performed by cutting free the flanks of the backbone or vertebral column by means of knife blades which are moved under control into the fish at both sides of the backbone. These blades have triangular shape and a forwardly projecting tip and slide underneath the rib bones in the manner of a wedge in the region of the belly cavity to scrape out these ribs from the belly wall. Thereafter, the deboning is completed by a tool which is formed by a pair of circular knives which are arranged in a roof-shaped manner with regard to each other and cut over the backbone to detach the same from the fish.

According to the patent of addition, a toothed disc is provided instead of the tool comprising the roof-shaped arranged circular knives, which toothed disc is formed by a pair of spaced toothed rings having teeth which project above the hub body of the toothed disc and are provided with peripheral cutting edges. A knife is arranged fixedly in the plane of rotation of the tips of the teeth. The width of this knife corresponds to the spacing of the toothed rings, while the leading portion of the knife is sharpened. It is the task of this knife to cut through the backbone at the tail root (FIG. 4 of DE 509 733) and to lift the backbone in the course of the further conveying, whereupon it may be taken out from the meat by the toothed disc.

Following the statements in the mentioned documents, the known apparatus is to be used, in general, in the processing of fish, particularly herrings. The expert, however, will recognise that this method can only be used for herrings or fish of the herring species due to the specific anatomic facts, the pulling conveyance by means of a tail clamp being a decisive prerequisite. The result does, by no means, meet today's demands in the product quality which, when the known method is used, is unsatisfactory insofar as the severing of the fish meat occurs only in the region of the teeth of the toothed disc which has the effect that when the backbone is lifted out the non-severed meat portions must be severed by tearing. The consequence of such action is that the fillets have a very rough surface in the back region, which cannot be accepted. On the other hand, the partial separation produced by the teeth has the effect that the connection between the flank portions of the fillet meat and the central meat strip containing the back spokes is weakened such that this meat strip is lifted out together with the back spokes when the backbone is lifted so that these meat portions are lost. This result also occurs due to the effect of the knife which separates the meat portions containing the back spokes as can be taken from FIG. 5.

OBJECTS AND SUMMARY OF THE INVENTION

Objects of the Invention

It is therefore the major object of the present invention to suggest an improved method appropriate for deboning fish as well as an apparatus for performing such method.

It is a further essential object of the present invention to gain fish meat by means of such method and apparatus in a manner that minimum loss occurs with the meat remaining in its natural structure.

SUMMARY OF THE INVENTION

In a method in which the fish to be processed is conveyed with its head end leading and which method comprises, in general, steps for detaching the belly and back spokes as well as the ribs and the vertebral column of the fish, these objects are achieved in that these steps comprise cutting free the belly spokes; then detaching the ribs from the fish in a known per se manner by cutting free the ribs up to the back spokes; and subsequently extracting the back spokes from the fish meat by displacing the cut-free skeleton.

In an apparatus comprising conveying means for advancing the fish with its heading leading in a conveying direction along a fish processing path, and tools for cutting free the belly spokes and the ribs up to the back spokes, respectively, these objects are achieved in that, when seen in the conveying direction, the tool for cutting free the ribs is followed by a pair of guiding elements arranged in a roof-shaped manner with regard to each other and engaging the incisions made by the rib tool between the ribs and the fish meat to perform a guiding action, which guiding elements leave between them, in a ridge area formed thereon, a gap for the passage of the back spokes, the edges of the guiding elements bounding the gap being formed as scraping edges, and a displacing element being arranged in the gap, bridging said gap and having an edge being directed counter to the conveying direction.

The advantages thus to be achieved essentially consist in that the yield in naturally structured fish meat is added to by those parts which are positioned between the back spokes.

For gaining fish meat in the form of double fillets connected to each other along their back line, the deboning action according to the present invention can be completed by a following step of a severing cut which is carried out from the belly side of the fish body in the area and in the plane of the back spokes.

For gaining fish meat in the form of individual fillets the fish body treated in the aforementioned manner can be processed further by removing the back fins together with their fin holders. This last mentioned processing step can also be carried out before the severing cut in the plane of the back spokes.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 2 shows a partial longitudinal section through the apparatus shown in FIG. 1 in the region of the rib tool, FIG. 3 shows a cross-section through the apparatus as shown in FIG. 1 in the region of the rib tool according to section line III—III, FIG. 4 shows a cross-section through the apparatus as shown in FIG. 1 in the area upstream of the displacing element along section line IV—IV, and FIG. 5 shows a cross-section through the apparatus as shown in FIG. 1 in the area of the severing knife along section line V—V.

DETAILED DESCRIPTION OF THE PREFERRED EMBODIMENTS

Figure 1:
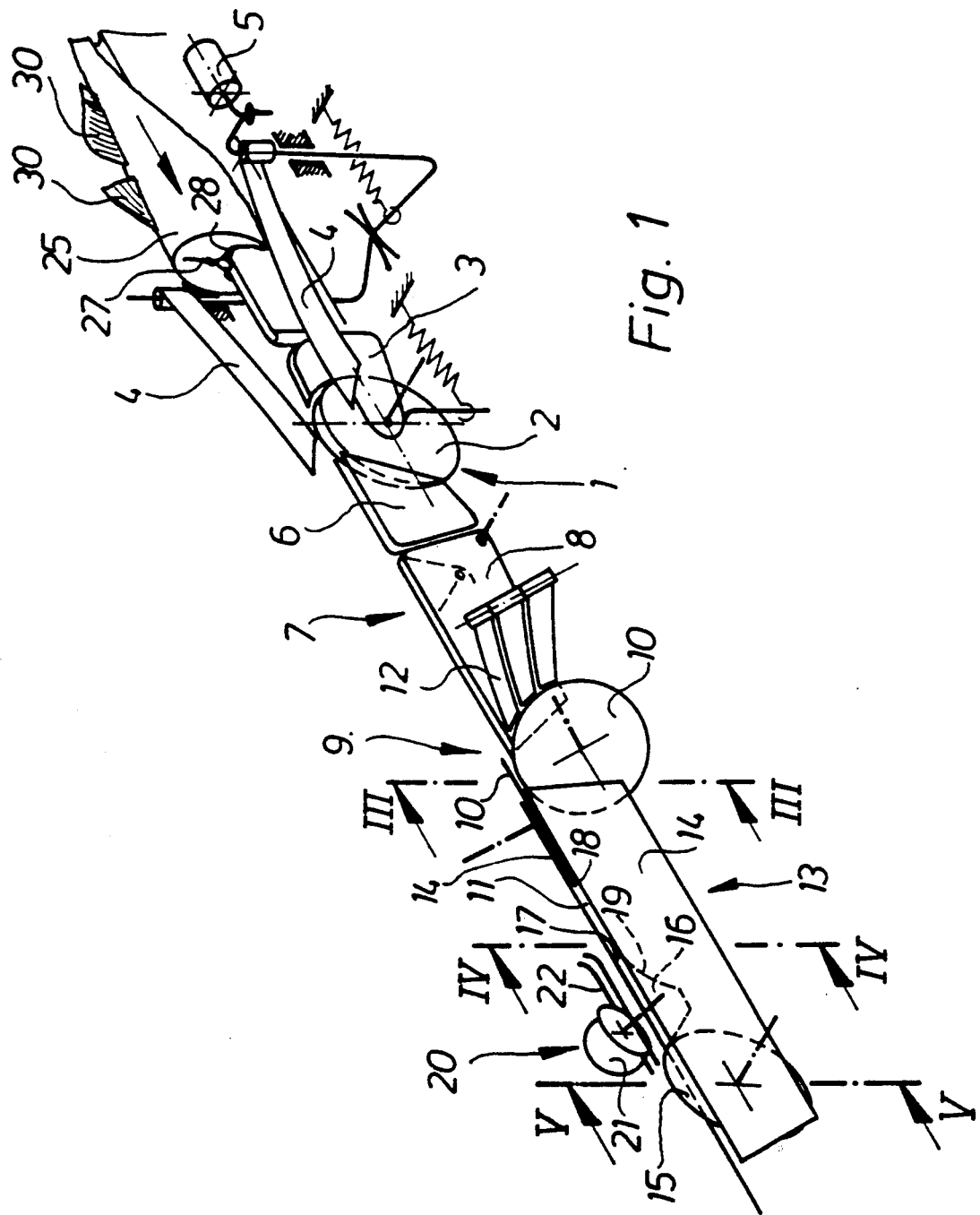
FIG. 1 shows a schematic overall view of the apparatus according to the present invention by way of an axonometric representation.

In a non-shown frame of a deboning apparatus for fish, a fish path is formed by conveying means as well as several guiding elements. In this fish path, fish rumps 25, which are opened at the belly, are advanced by the also non-shown conveying means which engage the fish bodies for example by their flanks. A series of tools for processing the fish rumps 25 are arranged along the fish path.

In the first place, the fish rump 25 to be treated comes into contact with a belly filleting tool 1 including a pair of circular knives 2 arranged parallel with regard to each other for making incisions in the fish rump 25 at both sides of belly spokes 26 of the fish. For supporting and guiding the fish during this processing step, an internal belly guide 3 is arranged immediately upstream of the belly filleting tool 1, which guide can be displaced downwardly against the force of a spring, which is shown in FIG. 1 but not provided with a reference numeral. A lateral guiding of the fish rump is achieved by external guides 4, which are arranged pivotably, this pivoting, preferably, occurring synchronously out of the fish path from their central position through setting and adjusting means 5.

The belly filleting tool 1 is followed by a supporting guide 6 which covers the rearward portions of the cutting edges of the circular knives 2. This supporting guide 6 is continued by a cutting counter support 7 which includes a pair of guide elements 8 arranged in a roof-shaped manner with regard to each other and extending into the area of a rib tool 9. The latter comprises a pair of driven circular knives 10 arranged in a similar manner as the guide elements 8, i.e. roof-shaped with regard to each other. As can also be taken from FIG. 3, the guide elements 8 and the circular knives 10 are arranged at a distance to each other, which distance is adjustable under control and corresponds essentially to the thickness of the ribs 28 which enclose the belly cavity of the fish. As can further be taken from FIG. 3, the circular knives 10 are arranged such that a gap 11 is left at the culmination position of their cutting edges, the width of this gap allowing the back spokes 27 to pass between the circular knives 10 without these knives becoming effective. Presser fingers 12, which are biased individually are arranged at both sides of and adjacent to the cutting counter support 7. These fingers 12 form a presser face capable of being adapted to the respective flank contours of the fish rump 25, and are effective immediately upstream of the cutting edges of the circular knives 10. The cutting counter support 7 can be controlled to move in a known per se manner depending on the position of the fish rumps 25 in the apparatus so that the activating of the rib tool 9 can be restricted to the period of time during which the belly cavity passes above this tool.

The rib tool 9 is followed by a roof-shaped guide 13 comprising a pair of guide faces or guide elements 14, which cover the rearward portions of the cutting edges of the circular knives 10 and continue the gap 11 between the circular knives 10, as can be taken from FIG. 4. In the rearward or end region of the guide 13, there is arranged a circular disc-shaped severing knife 15 which projects upwardly between the guide faces 14 through the gap 11 up into the region of the tips of the back spokes 27. Between this severing knife 15 and the rib tool 9 there is arranged a displacing element 16 which, as can be taken from FIGS. 1 and 3, bridges the gap 11 between the guide elements 14, an edge 17 of this displacing element 16 lying in the ridge area of the guide elements 14 and facing against the conveying direction of the fish rumps. This edge is formed as a bezel and has a certain bluntness to create a wedge effect. Immediately upstream of this edge 17 the edges of the guide elements 14 laterally bounding the gap 11 are formed as scraping edges 18. The displacing element 16 is further provided with a displacing face 19 extending downwardly in an arch-shaped manner.

Adjacent to the severing knife 15 and either in front thereof or behind the same there is arranged a fin cutting tool 20 above the guide 13. As indicated in FIGS. 1 and 5, this fin cutting tool comprises a pair of driven circular knives 21 placed in a V-shaped manner with regard to each other and having circumferential cutting edges which functionally contact each other in their lowermost point. The fin cutting tool 20 is mounted and guided in a suitable manner to be displaceable vertically and has a fork-shaped sensing or detecting element 22 in the form of a shoe which defines the depth of penetration of the fin cutting tool 20 into the fish rump 25 by supporting against the latter. A tool for straightening and erecting the fins, which is known per se and has not been shown in the drawings may be arranged, according to the processing demands, upstream of the fin cutting tool to safeguard that the back fins 30 arrive in a straightened manner in the area of the sensing element 22 (see e.g. German Patent 1 454 094).

The operation of the apparatus according to the invention is as follows:

A fish which has been decapitated mechanically or manually in a suitable manner and has been opened by its belly is advanced, with its face of the decapitation cut leading, over the internal belly guide 3 into the operative area of the belly filleting tool 1. Upon arrival of the fish rump 25 at this tool, the effectiveness thereof is suppressed by the internal belly guide 3 which is in its rest position, i.e. in a position in which it covers the leading cutting edges of the circular knives 2. Also, the external guides 4 are held out of contact with regard to the fish rump 25 by activating the setting and adjusting means 5. Upon arrival of the end of the belly cavity, the external guides 4 are controlled to move into contact with the fish rump 25, and the internal belly guide 3 is displaced against the force of the spring, so that the circular knives 2 are enabled to make incisions in the fish rump 25 at both sides of the back spokes 26 which penetrate the tail region of the fish, whilst the fish rump 25 is guided centrically.

The fish rump 25 thus prepared is now advanced to the rib tool 9, the cutting edges of the circular knives 10 thereof being in a free access position following a corresponding position of the cutting counter support 7 during the arrival of the face of the decapitation cut. Thus, the circular knives 10 are able to make cuts above the ribs 28 which are pressed to lie flat by the presser fingers 12, and to cut free the ribs up to the back spokes 27 from the fish meat. This step is continued until the belly cavity end arrives. At this moment, the guide elements 8 of the cutting counter support 7 are lifted, whereby the effectiveness of the circular knives 10 is ended, so that the tail portion of the fish rump 25 which has already been provided with incisions is guided over the rib tool 9 without further processing.

The cut-free ribs 28 are now within the roof space of the rib tool 9, while the meat portions which have been cut free from the ribs 28 can move or slide above the circular knives 10 of the rib tool 9 and finally onto the guide faces. During this action the back spokes 27 which have been freed in the region of their point of connection to the vertebral column 29 are guided in the gap 11 through these connection points and finally meet the edge 17 of the displacing element 16. The consequence of this is that the vertebral column 29 with its back spokes 27 which are inclined in an arrow-shaped manner towards the rump end of the fish are displaced out of the fish path by the displacing face 19. Thus, the back spokes 27 are submitted to a pulling force or torque which effects their extraction from the back portion of the fish meat which is retained by the guide elements 14, the scraping edges 18 supporting the slipping off of the meat from the back spokes 27.

The fish rump 27 may now be split in the plane of the removed back spokes 27 up to the region of their tips without any loss of fish meat occurring, by means of the severing knife 15 arranged downstream of the displacing element 16, so that a final product is achieved in the form of a double fillet. For gaining individual fillets, before or after performing this severing cut the fin strip including the fin holders 31 may be removed by means of the fin cutting tool 20, and the depth of cutting of the severing knife 15 may be adjusted such that the severing cut continues immediately in the produced back furrow.

What is claimed is:

1. An apparatus for deboning fish by processing fish having a skeleton including a vertebral column with belly spokes, back spokes and ribs extending therefrom, by deboning steps including detaching said belly spokes and back spokes as well as said ribs and said vertebral column from said fish, said apparatus comprising tool means at least for cutting free said belly spokes and said ribs up to said back spokes, respectively, guide means for guiding said fish during processing and conveying means for advancing said fish with its head end leading in a conveying direction along a fish processing path defined by said conveying means, said guide means and said tool means, wherein said apparatus comprises, downstream of said tool means for cutting free said ribs, when seen in said conveying direction, a pair of guiding elements being arranged in a roof-shaped manner with regard to each other to perform a guiding action by engaging the incisions made during said cutting-free of said ribs by said rib tool means between said ribs and the fish meat, said guiding having a ridge area with edges being formed as scraping edges and having a gap therebetween for the passage of said back spokes, and a displacing element being arranged in the gap bridging said gap and having a displacement edge being directed counter to said conveying direction for deflecting the skeleton away from the conveyor path to extract the back spokes whereby the skeleton is separated from the fish.

2. An apparatus as claimed in claim 1, wherein said displacement edge is blunt.

3. An apparatus as claimed in claim 1, wherein there is arranged, downstream of said tool means for cutting free said belly spokes and said ribs, a severing knife for cutting the fish from the belly side of the fish body in the region and in the plane of said back spokes.

4. An apparatus as claimed in claim 1, wherein said apparatus further comprises, arranged downstream of said tool means for cutting free said belly spokes and said ribs,
   a) a fin-cutting tool acting from the side of the back of the fish and arranged to remove back fins of said fish together with their fin holders from the fish body, and
   b) downstream of said fin-cutting tool, a severing tool arranged to operate from the belly side of the fish body in the region of said back spokes and in the plane thereof.

5. A method of deboning fish having a skeleton including a vertebral column with belly spokes, back spokes and ribs extending therefrom, to gain fish meat fillets separated from the skeleton, wherein a fish is conveyed along a processing path with head end leading through successive fish processing steps, said processing steps including:
   cutting free the belly spokes of the fish to detach the belly spokes from the fish;
   detaching the ribs from the fish by cutting free the ribs up to the back spokes; and
   subsequently deflecting the skeleton away from the conveying path to extract the back spokes from the fish meat whereby the skeleton is separated from the fish.

6. An apparatus for deboning fish having a skeleton including a vertebral column with belly spokes, back spokes and ribs extending therefrom, to gain fish meat fillets separated from the skeleton, said apparatus having a conveyor for conveying the fish along a path with its head end leading through successive fish processing areas, comprising:
   a first area having first knives for cutting free said belly spokes of the fish to detach the belly spokes from the fish;
   a second area having second knives for cutting the ribs free from the fish meat up to the back spokes; and a third area having a pair guide elements extending along the conveyor path to guide and support the fish between the ribs and the fish meat, said guiding elements having free ends extending along the conveying path of the fish with a gap between said free ends for receiving therebetween the back spokes of the fish, and a displacing element bridging said gap and having edge means positioned to engage the back spokes of a fish being conveyed for deflecting the skeleton away from the conveying path to extract the back spokes from the fish meat whereby the skeleton is separated from the fish.

7. An apparatus as claimed in claim 6, further comprising a fourth area downstream of said third area having a severing knife cutting into the fish from a belly side of the fish along a plane of the back spokes for cutting said fish to gain a double fillet.

8. An apparatus as claimed in claim 6, further comprising a fourth area downstream of said third area having a fin-cutting tool for removing back fins of the fish together with their fin holders, and a severing knife cutting into the fish from a belly side of the fish along a plane of the back spokes for cutting said fish to gain a double fillet.

9. An apparatus as claimed in claim 6, wherein said third area further includes said guiding elements covering the downstream portion of the second knives of said second area so that said guiding elements engage the cuts made by said second knives; and said displacing element further including a blunt edge as said edge means for wedging between said back spokes of the fish and the fish meat and a displacing face extending outwardly from said edge with respect to the conveying path to deflect the skeleton.

10. An apparatus as claimed in claim 9, wherein said displacing face of said displacing element has an arch shape extending outwardly from said conveying path to deflect the skeleton away from the conveying path and wherein a portion of said ends of the guiding elements are formed as scraping edges immediately upstream along the conveying path from the edge of the displacing element for supporting the slipping off of the meat from the back spokes.

* * * * *